March 19, 1968     M. J. TEITT     3,373,969

VALVE FOR VACUUM SERVICE

Filed Oct. 6, 1965     2 Sheets-Sheet 1

INVENTOR.
Matthew J. Teitt
BY
ATTORNEY.

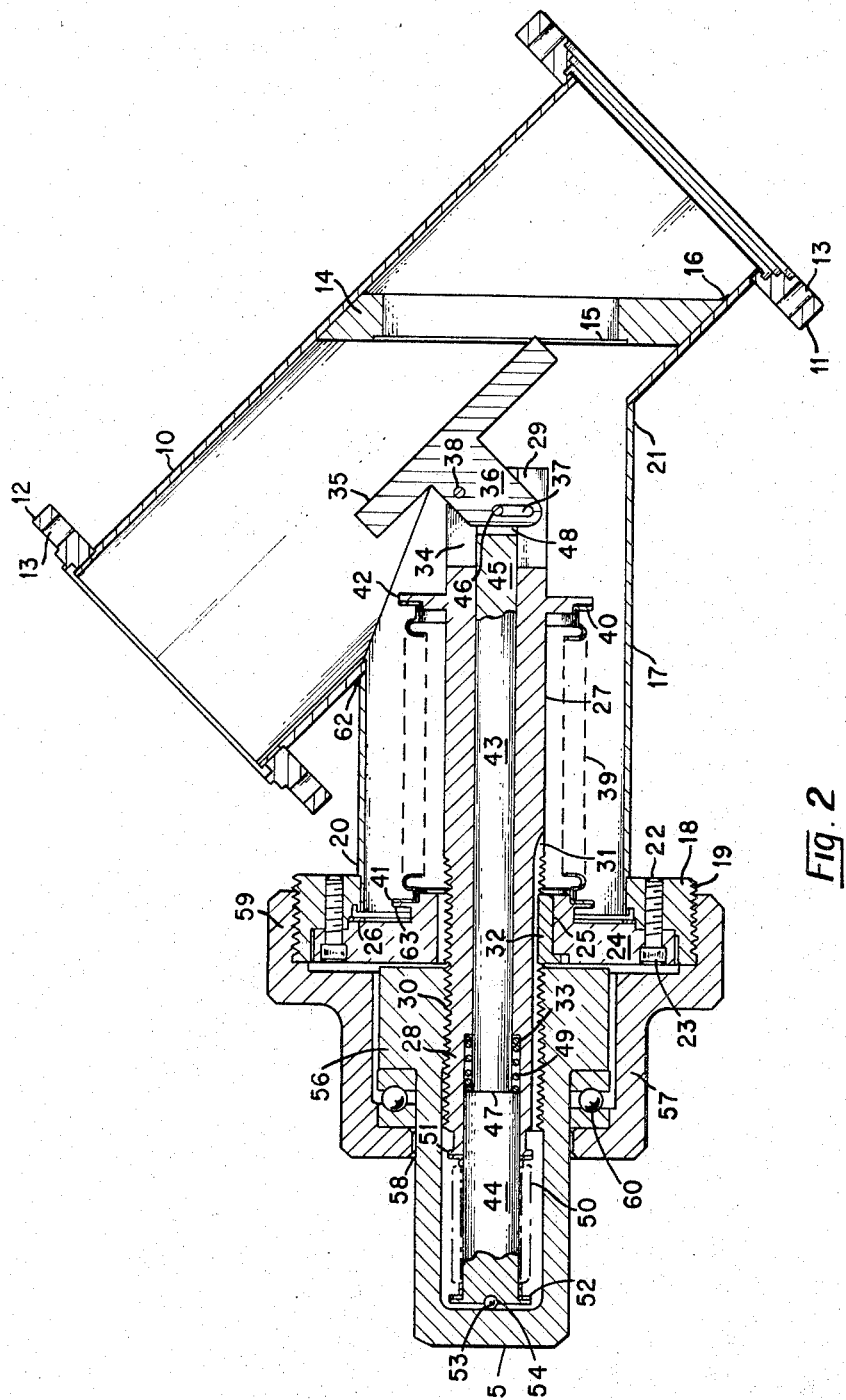

United States Patent Office 3,373,969
Patented Mar. 19, 1968

3,373,969
VALVE FOR VACUUM SERVICE
Matthew J. Teitt, Trafford, Pa., assignor, by mesne assignments, to the United States of America as represented by the United States Atomic Energy Commission
Filed Oct. 6, 1965, Ser. No. 493,597
2 Claims. (Cl. 251—229)

This invention relates to valves and particularly to valves for vacuum service.

Industrial applications have made necessary the development of large aperture valves suitable for vacuum service. Early designs were based upon the remodeling of the usual type of fluid control valves to meet the more rigorous demands of vacuum systems.

Two general classes of valves are now in use, namely valves that withstand atmospheric pressure from either side without leakage and secondly, valves that hold only when excess pressure is exerted in one direction. The second type is used when a large aperture is required together with a high speed of operation.

Serviceable valves have been constructed from standard gate and globe valves. However, some difficulties arise with these valves. First, there are no commercially availabe gate valves having metal seals with a high enough closing force for certain applications.

Accordingly, it is an object of the present invention to provide a valve for a high vacuum system so that when the valve is open a straight line flow is provided therethrough.

It is another object to provide a low impedance valve for a high vacuum system.

It is another object to provide a valve for a high vacuum system that has a high closing force.

It is another object to provide a fast acting mechanism for closing and opening a valve for a high vacuum system.

It is another object to provide a valve that has a complete vacuum seal when closed.

The present invention is a valve for a high vacuum system wherein an outer tubular valve stem is disposed in a valve casing having a valve seat. Within the valve casing is disposed a valve member which has attached thereto a lug having a cam slot which is pivotally mounted on the outer valve stem. An inner valve stem is slideably disposed within the outer valve stem and has a pin slideably disposed with the cam slot. Axial movement of the outer valve stem either holds the valve closed in a position of parallelism with the valve seat to a position substantially at an angle thereto to provide a straight line flow therethrough.

Various other objects and advantages will appear from the description of the following embodiment of the invention and from the accompanying drawings wherein:

FIGURE 2 is a cross-sectional representation of the valve in fully opened position.

Figure 1:
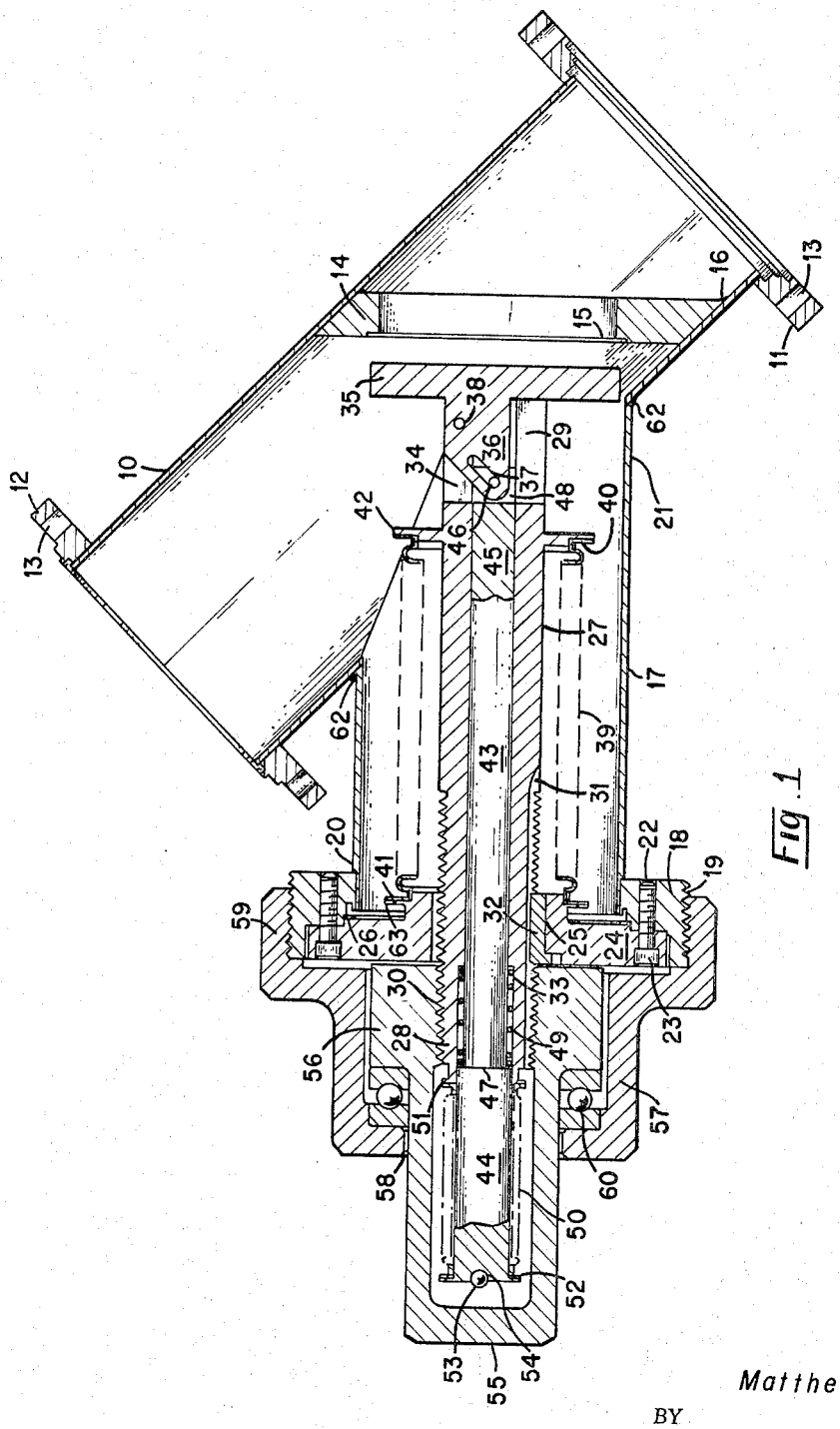
FIGURE 1 is an improved valve according to the invention in cross section showing the valve in a nearly closed position.

In the illustrated embodiment of the invention, valve casing 10 has an annular attaching flange 11 at one end concentric with the flow axis of the casing and has a similar annular attaching flange 12 at the other end of the casing. Attaching flanges 11 and 12 are provided with mounting holes 13 for receiving coupling bolts (not shown) so that the valve casing can be inserted in a pipe line.

Diagonally disposed within valve casing 10 is annular valve seat member 14 which has an annular valve seat 15. Valve seat member 14 may be secured to valve casing 10 by means of weld 16.

A bonnet 17 having a distal end 20 and a proximal end 21 is attached at the proximal end 21 to valve casing 10 preferably by means of weld 62.

An annular housing 18 having a threaded outer cylindrical surface 19 is secured to distal end 20 of bonnet 17. Annular housing 18 is provided with a plurality of tapped holes 22.

Secured to annular housing 18 by means of mounting screws 23 disposed within tapped holes 22 is annular flange 24 having a keyway 25. A gold O-ring 26 is disposed between housing 18 and flange 24 to provide a seal therebetween.

Disposed through annular flange 24 is an outer tubular valve stem 27 having a distal end 28 and a proximal end 29. Distal end 28 of outer valve stem 27 is threaded as indicated by reference figure 30. Distal end 28 of outer valve stem 27 is also provided with a keyway 31 so that L-shaped key 32 disposed in keyways 25 and 31 permits only axial, not rotational movement of outer valve stem 27. The inside diameter of outer tubular valve stem 27 is increased at the distal end 27 so as to define a cylindrical shoulder 33. Proximal end 29 of valve stem 27 is provided with a slot 34.

Cylindrical bellows 39 having flanges 40 and 41 is secured respectively to flange 42 carried by outer valve stem 27 and annular protrusion 63 on annular flange 24 so as to provide a flexible vacuum seal between outer valve stem 27 and flange 24.

Disposed at the proximal end 29 of the outer tubular valve stem 27 is a cylindrical valve member 35 adapted to be seated in annular valve seat 15 carried by valve seat member 14. A lug 36 having a cam slot 37 is secured to valve member 35 and is pivotally carried by the outer valve stem 27 by means of pin 38 so as to be disposed within slot 34 of valve stem 27.

Slideably disposed within the outer tubular valve stem 27 is a cylindrical inner valve stem 43 having a distal end 44 and a proximal end 45. Proximal end 45 of inner stem 43 is provided with a slot 48 so that lug 36 may be disposed therein. A cam pin 46 carried by inner valve stem 43 is slideably disposed within cam slot 37 of lug 36. The distal end 44 of inner valve stem 43 is of a diameter greater than the proximal end 45 of inner valve stem 43 which is slideably disposed within outer tubular valve stem 27. Distal end 44 of inner valve stem 43 is adapted to be slideably disposed within the increased inner diameter at the distal end 28 of valve stem 27 so as to define a shoulder 47. Resilient spring means 49 adapted to be placed over cylindrical inner valve stem 43 is disposed against shoulder 33 of outer valve stem 27 and shoulder 47 of inner valve stem 43 so as to urge valve stems 27 and 43 apart.

At the distal ends 28 of outer valve stem 27 and 44 of inner valve stem 43 a second bellows 50 having flanges 51 and 52 is provided. Flanges 51 and 52 are fastened to outer valve stem 27 and inner valve stem 43 to secure a flexible vacuum seal therebetween. Distal end 44 of inner valve stem 43 is provided with a ball 53 rotatably secured in a socket 54 so as to constitute a ball bearing.

A tubular driver 55 having a threaded annular flange 56 threadable engages the threadings 30 on distal end 28 of outer tubular valve stem 27. To secure driver 55, a cap 57 having an aperture 58 and an inner threaded flange 59 is disposed about driver 55 by threadably engaging inner threaded flange 59 and threaded surface 19 of annular housing 18. To provide a seal that will permit rotational movement between driver 55 and cap 57, a thrust bearing 60 is disposed therebetween.

In operation resilient spring means 49 tends to separate inner valve stem 43 and outer valve stem 27 so as to place an upward force on inner valve stem 43. The upward force on inner valve stem 43 transmits via cam pin 46 and cam slot 37 the force to hold valve member 35 against outer valve stem 27. Turning driver 55, for example by a wrench (not shown), moves outer valve stem 27 in an axial direction as so to force valve member 35 into valve seat 15. Axial movement is only permitted since outer valve stem 27 is prevented from rotating by means of key 32.

To open the valve, driver 55 is turned in a direction opposite to the direction used to close the valve so as to unseat valve member 35 from valve seat 15. The outer valve stem 27 is further moved in an axial direction which transmits a force via spring 49 to move inner valve stem 43 towards driver 55 until ball 53 rests against driver 55 so as to prevent inner stem 43 from further axial movement. The continued rotation of driver 55 compresses spring 49 and moves outer valve stem 27 in a direction towards driver 55. In that inner valve stem 43 is contained, the position of cam pin 46 is fixed with respect to outer valve stem 27. Continued movement of outer stem 27 moves pivot pin 38 towards driver 55 so as to cam valve member 35 to an open position to allow less flow obstruction so that the valve member 35 is in a position substantially at an angle to valve seal 14 to provide a straight line flow therethrough.

In returning to a closed position, the first movement of driver 55 relieves the compression of spring 49 and permits the movement of pivot pin 38 with respect to cam pin 46 so as to cam the valve seat 35 to a position shown by the solid line in the figure before positive seating forces are applied.

It will be understood that various changes in the details, material, steps and arrangement of parts which have herein been described and illustrated in order to explain the nature of the invention may be made by those skilled in the art within the principle and scope of the invention as expressed in the appended claims.

I clam:
1. A valve for vacuum service comprising:
   (a) a housing containing a valve member and a valve seat therein;
   (b) a stem assembly disposed within said housing comprising an outer member and an inner member slidably disposed within said outer member;
   (c) means for first causing combined axial movement of the outer member and the inner member while the valve member is proximate the valve seat and for secondly causing relative axial movement of the outer member with respect to the inner member while the valve member is distant the valve seat;
   (d) said valve member, adapted for sealing engagement with the valve seat, being mounted to the outer member and cammed to the inner member of the stem assembly so that combined axial movement of the outer member and the inner member causes axial movement of the valve member and relative axial movement of the outer member with respect to the inner member causes pivotal movement of the valve member,
   whereby the valve member moves from sealing contact with the valve seat to a position allowing substantial unimpeded flow through the valve.

2. A valve for vacuum service according to claim 1 wherein said means for causing relative and combined axial movement of the outer member and the inner member comprises:
   (a) means for allowing only axial movement of the outer member with respect to the housing;
   (b) driver means threadably engaging the end of the outer member for axially moving said outer member;
   (c) spring means engaging the outer and inner members for preventing free pivotal movement of the valve member while permitting combined inner and outer member axial movement; and
   (d) means for acting upon the extended end of the inner member to limit axial movement of the inner member once a prescribed distance of combined inner and outer member axial movement has occurred.

References Cited
UNITED STATES PATENTS

| | | | |
|---|---|---|---|
| 1,766,689 | 6/1930 | Richard | 251—228 X |
| 2,106,723 | 2/1938 | Collison | 251—229 |
| 3,108,780 | 10/1963 | Wishart | 251—335 X |
| 3,315,700 | 4/1967 | Greenwood | 251—335 X |

ALAN COHAN, *Primary Examiner.*

D. R. MATTHEWS, *Assistant Examiner.*